Patented Nov. 17, 1959

2,913,426

METHOD OF POLYMERIZING STYRENE IN A RUBBER USING TERTIARY BUTYL PERBENZOATE AND AN AZO CATALYST

Tsi T. Li, Milltown, and Robert W. Raetz, Westfield, N.J., assignors to Catalin Corporation of America, a corporation of Delaware No Drawing. Application February 20, 1957
Serial No. 641,254

5 Claims. (Cl. 260—4)

This invention relates to polymerization of styrene monomers in the presence of a rubber and in particular the invention relates to an improved catalyst system which gives a resinous product with exceptionally high impact strength.

In accordance with the present invention a styrene monomer is suspended in aqueous liquid and polymerized in the presence of a rubber with a catalyst system comprising the combination of an organic azo compound and tertiary butyl perbenzoate. When this is done a hard bead polymer is formed which may be readily separated from the aqueous suspending medium for further processing and the final resinous product has exceptionally high impact strength. The mechanism of the way in which the two catalysts of the system work to form a hard bead polymer with high impact strength is not now fully understood but it is a fact that the free radical system generated by this combination of catalysts has been demonstrated to produce the desired result. On the other hand, neither of the catalysts alone will give the desired result. Tertiary butyl perbenzoate when used alone gives polymer beads which are soft and sticky and so difficult to separate from aqueous suspension that the process is unsatisfactory for commercial use. Beads which are produced have exceedingly low impact strength. Although the azo catalyst alone will give a hard bead polymer, the impact strength of the product is unsatisfactory as compared to the high impact strength bead polymer achieved in accordance with the teaching of the present invention.

The present invention may be most conveniently carried out by dissolving a rubber in a styrene monomer which is then suspended in aqueous medium in a suitable vessel. The two catalysts are then added either separately or in combination and suspension polymerization is carried out by heating the mixture preferably with gentle agitation at a temperature of about 80 to 110° C. The temperature may be raised to about 120° C. near the end of the reaction to insure as complete polymerization of the styrene monomer as possible. The liquid mixture is then allowed to cool and the resulting polymer in the form of beads is filtered out, washed and dried.

The term "hard bead polymer" as used herein is intended to mean small droplets of monomer which have been polymerized to the extent of forming beads that may be readily filtered from suspension and washed without serious difficulty caused by the beads sticking together in agglomerates. The term "a rubber" as used herein includes the natural and synthetic rubbers in liquid or solid form which are capable of forming a compatible admixture with the styrene monomer.

The selected rubber is preferably one which can be dissolved in the styrene monomer. Examples of rubbers that have been used with excellent results include butadiene polymerized with styrene or acrylonitrile, polyisobutylene, polychloroprene, isobutylene-styrene copolymer, isobutylene-isoprene copolymer and natural rubber. If the rubber used is in the form of a liquid latex we prefer to coagulate such rubber in known manner to form crumbs which are then washed to remove the coagulant. Slab rubber is pelletized and washed. Washing in the case of synthetic rubber removes shortstop agent as well as any fatty acid emulsifiers that may be present. The pelletized slab rubber or coagulated crumb may be dissolved in the styrene monomer by mixing the two and agitating the mixture until a portion of the rubber dissolves. After agitation the mixture is strained to remove dirt and undissolved lumps of rubber. The amount of rubber employed may be varied but in general it will constitute from about 2.0% to 30% by weight of styrene monomer.

Suspension polymerization is preferably carried out in aqueous medium and any of the known suspension stabilizers may be used to hold the styrene monomer and rubber in suspension such as polyvinyl alcohol, water soluble soaps, gelatine, starch and gums and water-soluble copolymer salts such as the sodium salt of styrene-maleic anhydride copolymer. Water insoluble suspension stabilizers such as talc, bentonite, and calcium, barium, aluminum and zinc phosphates may be used. The amount of stabilizer employed will vary but in general about 0.3 to 2.5% of stabilizer based on weight of water is employed. The preferred amount of stabilizer is from about 1.0% to 1.5% by weight of the water.

The monomer may be styrene monomer itself or it may be one of the known modified styrene monomers such as ortho-methylstyrene, meta-ethyl styrene, para-isopropyl-styrene, para-methylstyrene, dimethyl styrene, monochlorstyrene, dichlorstyrene and the like may be used either alone or in combination. The amount of styrene monomer-rubber mixture suspended in water is that ordinarily employed in the art and in general the monomer-rubber mixture will constitute about ⅓ to 1½ parts for each part of water in the reaction mixture.

If desired, known lubricants may also be added to the reaction mixture in order to improve flow characteristics of the final product. The amount of lubricant employed may be varied and it will ordinarily be from about 0.5 to 5.0% by weight of the monomer-rubber mixture. The preferred amount of lubricant is about 1.0 to 2.5% by weight. Examples of lubricants include esters of higher fatty acids and esters of the lower polyhydric alcohols such as ethyl stearate, butyl stearate, ethylene glycol dilaurate, dibutyl or dicyclohexyl phthalate, butyl phthalyl butyl glycolate, palm oil, cocoanut oil and tricresyl phosphate. Other materials may also be used such as mineral oils and low polymers of styrene.

As to the catalyst system, the azo catalyst is an organic azo compound containing an acyclic azo —N=N— group having bonded to each nitrogen a discrete carbon or other atom which may be of the class of aliphatic, cyclo aliphatic or aromatic carbon atoms. The azo catalyst may be a colorless azo compound wherein both valences of the azo group are satisfied by completely aliphatic radicals bonded to the nitrogen from tertiary aliphatic carbon and further bonded to a negative substituent of the class consisting of the nitrile, carbalkoxy and carbon-amido groups. Examples of the azo catalysts are alpha, alpha-azodiisobutyronitrile; alpha, alpha-azobis (alpha-gamma-dimethyl-valeronitrile); dimethyl and diethyl alpha, alpha-azodiisobutyrate; 1,1-azodicyclohexanecarbonitrile; alpha, alpha-azobis (alpha-ethyl-butyronitrile); alpha, alpha-azodiisobutyrocarbonamide; and p-methoxy benzene diazo thio 2-naphthyl ether.

The selected azo catalyst is used in combination with tertiary butyl perbenzoate which it will be noted is an oil soluble peroxide. Since the perbenzoate is oil soluble it readily dissolves in the styrene monomer liquid and it thereafter remains in the globules of styrene monomer and is not dissolved out by water. While the total amount .

of catalyst can be varied, best results are achieved with about 0.1 to 1.0% total catalyst based on the weight of styrene monomer in the reaction mixture. The preferred amount of total catalyst is about 0.2 to 0.4% by weight. The ratio of azo catalyst to tertiary butyl perbenzoate may also be varied but for hard bead polymers with high impact strength we prefer to use about 0.25 to 1.0 part by weight of tertiary butyl perbenzoate for each part by weight of the azo catalyst. Best results are achieved with approximately a 1 to 1 ratio between the two catalysts. Another advantage of the catalyst system of the present invention which makes the high impact polymer extremely useful is that the polymer has excellent extrusion characteristics and its flow during extrusion compares favorably with general purpose polystyrene currently in use which is polymerized in the absence of rubber. Although many catalyst combinations have been investigated, none of these give a high impact polystyrene with the excellent extrusion characteristics of the polystyrene-rubber polymer of the present invention.

In carrying out the polymerization reaction of the present invention it is preferred to blanket the reaction mixture with an inert substance such as nitrogen gas and best results are achieved by rapidly bringing the polymerization reaction mixture to a temperature of about 90° C. where it is held for about six hours. At the end of this time polymerization will be about 90% to 95% complete and the bead polymer is hard enough to prevent any serious sticking together. The reaction mixture is then heated to a temperature of about 104° C. and held at this temperature for about 2 to 4 hours. Finally the mixture is heated to about 110° C. and held at this temperature for 1 to 2 hours. During polymerization the mixture is gently agitated which tends to assist the polymerization reaction. The resulting hard bead polymer is then filtered from the aqueous medium and washed to remove the suspension stabilizer. Preferably the beads are re-suspended in fresh deionized water or in distilled water and the mixture stirred to remove the last traces of suspension stabilizer and to break up any bead clusters that may have formed. The beads are then filtered and air dried at a temperature of about 60 to 90° C. Other known means may of course be employed for drying the beads. Since the rubber in the bead polymer is unvulcanized, an antioxidant is preferably added to the beads in known manner prior to extrusion to prevent degradation of the styrene-rubber polymer under the high temperatures experienced in extrusion operations.

The following examples are given to further illustrate details of the present invention.

*Example 1*

2.5 pounds of polyvinyl alcohol (suspension stabilizer) were dispersed in 125 pounds of deionized water at room temperature by agitating the mixture for about thirty minutes. The temperature of the mixture was then raised to 90 to 95° C. and the liquid was held at this temperature for about two hours. The aqueous liquid was then filtered and placed in a glass lined reactor and additional water was added to make a total of 200 pounds of liquid. Concentration of the polyvinyl alcohol was about 1.25% by weight of water.

A separate monomer mixture was made up as follows:
9.0 pounds of crumb rubber which had been previously coagulated from synthetic rubber latex (butadiene-styrene copolymer) and washed and dried, was added to a mixture containing 39.25 pounds of styrene monomer, 39.25 pounds of vinyl toluene (vinyl toluene is available on the open market; it contains about 3 parts by weight of metamethyl styrene and 1 part by weight of para-methyl-styrene) and lubricant. The lubricant in the mixture consisted of 610 grams of butyl stearate and 610 grams of Dow Resin 276V2 (a low polymer of styrene consisting of a mixture of alpha methyl styrene and alpha methyl para-methyl styrene). The rubber was dissolved in the styrene mixture by stirring at room temperature for about four hours and the mixture was then filtered to remove lumps of undissolved material. Total yield of mixture about 90 pounds. 73.5 grams of azobisisobutyronitrile (0.18% based on weight total monomers plus rubber) and 61.0 grams of tertiary butyl perbenzoate (0.15% based on weight of total monomers plus rubber) were added to the mixture and the whole stirred for about fifteen to twenty minutes to dissolve the catalyst.

The monomer mixture was then added to the aqueous liquid in the glass-lined reactor and the reaction mixture was gently agitated. A stream of nitrogen gas was passed into the air space above the liquid to displace all air and the temperature of the reaction mixture was raised to 90° C. and held at that temperature for six hours. The temperature was then raised to 104° C. and held at that temperature for two hours and then the temperature of the reaction mixture was finally raised to 110° C. and held at that temperature for about one hour. The reaction mixture was cooled to 49° C. and the resulting hard polymer bead filtered from the mother liquor. The beads were washed with deionized water in a centrifuge and then suspended in fresh deionized water to remove the last traces of polyvinyl alcohol. The beads were dried by removing water in a centrifuge and then the beads were placed on screens and finally dried in an air circulating oven for 4 to 6 hours at 70° C. The resulting beads were hard and well-formed. A sample was extruded and molded in the form of ½ inch by ½ inch by 5 inch test bars. These bars gave a notched impact strength of 2.14.

*Example 2*

The procedure specified in Example 1 was followed using 8% of rubber and a catalyst composed of 0.15% alpha,alpha-azodiisobutyronitrile and 0.15% tertiary butyl perbenzoate. This procedure gave good hard beads and a notched impact strength of 2.12.

*Example 3*

The procedure specified in Example 1 was also followed in this example using 10% of rubber and a catalyst made up of 0.20% diethyl alpha, alpha-azodiisobutyrate and 0.15% tertiary butyl perbenzoate. This procedure also gave hard beads and a notched impact strength of 2.10.

It will be understood that it is intended to cover all changes and modifications of the preferred form of invention herein chosen for the purpose of illustration which do not constitute departures from the spirit and scope of the invention.

What we claim is:

1. In bead suspension polymerization of a polymerizable monomer selected from the group consisting of styrene and a ring substituted styrene in the presence of a rubber which is a polymer selected from the group consisting of polymers of conjugated dienes and polymers of isobutylene in aqueous medium, the method which comprises the step of carrying out polymerization in the presence of catalytic amounts of a two catalyst system, one of said catalysts being an azo polymerization catalyst and the second of said catalysts being tertiary butyl perbenzoate.

2. A method as specified in claim 1 in which the total weight of both catalysts is not over about 1.0% by weight of polymerizable monomer.

3. A method as specified in claim 1 in which the tertiary butyl perbenzoate is present in proportion of about 0.25 to 1.0 part by weight for each part by weight of the azo polymerization catalyst.

4. In bead polymerization of a polymerizable monomer selected from the group consisting of styrene and a ring substituted styrene in the presence of a rubber which is a polymer selected from the group consisting of polymers of conjugated dienes and polymers of isobutylene, the method which comprises the steps of forming an aqueous suspension of such monomer and such rubber, adding catalytic amounts of a two catalyst system to the aqueous suspension, one of said catalysts being an azo polymerization catalyst and the second of said catalysts being tertiary butyl perbenzoate, gently agitating the suspension and applying moderate heat to form hard bead polymers and then after polymerization is complete separating the beads from the aqueous suspension.

5. In bead polymerization of a polymerizable monomer selected from the group consisting of styrene and a ring substituted styrene in the presence of a rubber which is a polymer selected from the group consisting of polymers of conjugated dienes and polymers of isobutylene the method which comprises the steps of forming a suspension in aqueous medium of such monomer and a rubber in which the total amount of both monomer and rubber constitutes between about ⅓ to 1 and ½ parts for each part of aqueous medium and in which the amount of rubber is between about 2.0 to 30.0% by weight of monomer, adding between about 0.1 to 1.0% by weight of monomer of a combination of at least two catalysts, one of said catalysts being an azo polymerization catalyst and the second catalyst being tertiary butyl perbenzoate and the perbenzoate being present in the proportion of about 0.25 to 1.0 part by weight for each part by weight of the azo catalyst, gently agitating the suspension and applying moderate heat to form hard bead polymers and then separating the bead polymers from the aqueous suspension.

References Cited in the file of this patent

UNITED STATES PATENTS

| | | |
|---|---|---|
| 2,422,550 | Jacobson | June 17, 1947 |
| 2,668,806 | Howard et al. | Feb. 9, 1954 |
| 2,776,273 | Richard | Jan. 1, 1957 |
| 2,780,605 | Bevilacqua | Feb. 5, 1957 |

OTHER REFERENCES

"The Polymerization of Vinyl Monomers in Natural Rubber Latex" (Bloomfield et al.), Journal Applied Chemistry, 5, November 1955, page 611 relied on.